Nov. 23, 1954    J. A. SENN ET AL    2,694,961
MACHINE TOOL POSITIONING MECHANISM
Filed Jan. 15, 1949    7 Sheets-Sheet 1

Fig. 1

INVENTORS.
Jurg A. Senn
Herbert R. Schlichting
BY
W. D. O'Connor
Attorney Nov. 23, 1954  J. A. SENN ET AL  2,694,961
MACHINE TOOL POSITIONING MECHANISM
Filed Jan. 15, 1949  7 Sheets-Sheet 2

Nov. 23, 1954       J. A. SENN ET AL       2,694,961
         MACHINE TOOL POSITIONING MECHANISM
Filed Jan. 15, 1949                        7 Sheets-Sheet 4

INVENTORS
Jurg A. Senn &
Herbert R. Schlichting.
BY
W. D. O'Connor
Attorney

Nov. 23, 1954   J. A. SENN ET AL   2,694,961
MACHINE TOOL POSITIONING MECHANISM
Filed Jan. 15, 1949   7 Sheets-Sheet 7

INVENTORS
Jurg A. Senn &
Herbert R. Schlichting
BY
W. D. O'Connor
Attorney

United States Patent Office 2,694,961
Patented Nov. 23, 1954

2,694,961

MACHINE TOOL POSITIONING MECHANISM

Jurg A. Senn and Herbert R. Schlichting, Milwaukee, Wis., assignors to Kearney & Trecker Corporation, West Allis, Wis., a corporation of Wisconsin Application January 15, 1949, Serial No. 71,082

18 Claims. (Cl. 90—21)

This invention relates generally to positioning mechanism for precisely positioning movable elements of machine tools and more particularly to mechanism for performing a predetermined positioning cycle in effecting a plurality of machining operations.

A general object of the invention is to provide an improved positioning mechanism for precisely positioning a movable machine tool element.

Another object is to provide an improved automatic positioning mechanism presenting means for setting up a predetermined positioning cycle of operation for a machine tool element.

Still another object of the invention is to provide an improved machine tool positioning mechanism including means to automatically control the power movement of a machine tool element at a traversing rate and thereafter effect movement of the element at a reduced rate until final positioning is accomplished.

Another object of the invention is to provide precision positioning control means designed to maintain a high degree of positioning accuracy.

Another object is to provide an improved precision control means including a precision screw and nut assembly operative selectively through one of a plurality of trip dogs.

Another object of the invention is to provide an improved precision positioning mechanism including electrical and hydraulic control means.

Another object of the invention is to provide an improved positioning mechanism and an improved clamping means automatically functionable during predetermined intervals of a positioning cycle.

Another object of the invention is to provide an improved positioning mechanism in which errors inherently present in the control mechanism thereof may be readily determined and compensated for.

Another object of the invention is to provide an improved positioning mechanism including a precision screw and nut assembly retained for axial movement on a straight edge attached to a machine tool.

Another object of the invention is to provide an improved positioning mechanism arranged with selectively operable control means to provide for manual, power, or automatic cyclic positioning of a movable machine tool element.

According to this invention, an improved precision positioning mechanism is provided which is especially adaptable to machine tool structure. The mechanism is shown mounted to precisely control the positioning of a work retaining table member of a milling and boring machine sequentially at any one of a plurality of positions. In order to accomplish precision positioning, the table is driven at a traversing rate until it reaches the proximity of the preselected position and, thereafter, at a slow rate until all power is disconnected and precise positioning of the movable table is effected. An auxiliary drive to the positioning mechanism is provided for this purpose. Control of the positioning mechanism is automatically effected by means of an axially and rotatably movable precision screw operative in conjunction with a precision actuating nut, which, in turn, is disposed to engage a predetermined one of a plurality of trip dogs selectively mounted on a dog retaining drum rotatably carried with the table. When each of the predeterminately positioned trip dogs is indexed to engage the actuating nut at a selected position of the table in reference to a measuring standard contained in the positioning mechanism attached to the bed, they serve to first actuate a pretrip mechanism which operates to halt further travel at traversing rate and institute a positioning function during which the table is driven at a reduced rate and the precision screw and nut is axially shifted to effectively control the precise positioning of the table. Electric and hydraulic control means are utilized to effect the aforesaid positioning control. Adjusting means are provided to predeterminately adjust the effectiveness of the trip dogs and the precision screw and nut assembly in accomplishing precise positioning of the table.

The foregoing and other objects of the invention which will become more fully apparent from the following disclosure, may be achieved by means of the particular machine tool positioning mechanism herein described in connection with, and depicted in, the accompanying drawings, in which.

While the apparatus shown in the drawings and disclosed as an improved type of precision positioning mechanism is a preferred embodiment of the invention, it is to be understood that various features of the invention may be utilized with equal advantages in other types of machine tools and in various other machines.

Figure 1:
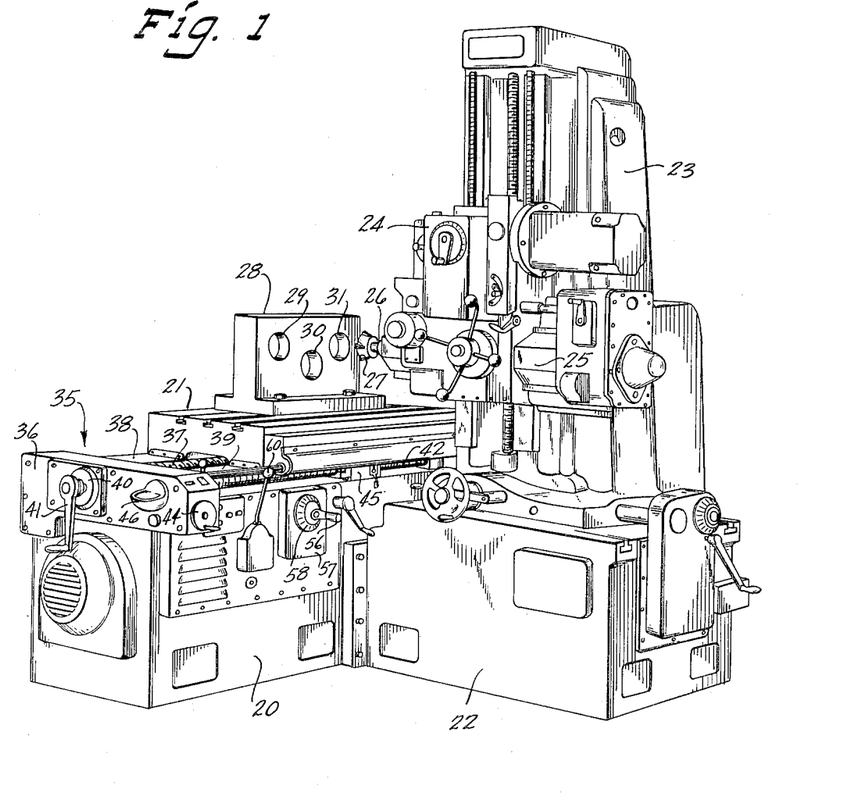
Figure 1 is a general view in perspective of a milling and boring machine with the precision positioning mechanism attached thereto and embodying the various features of the invention disclosed herein.
Figure 2:
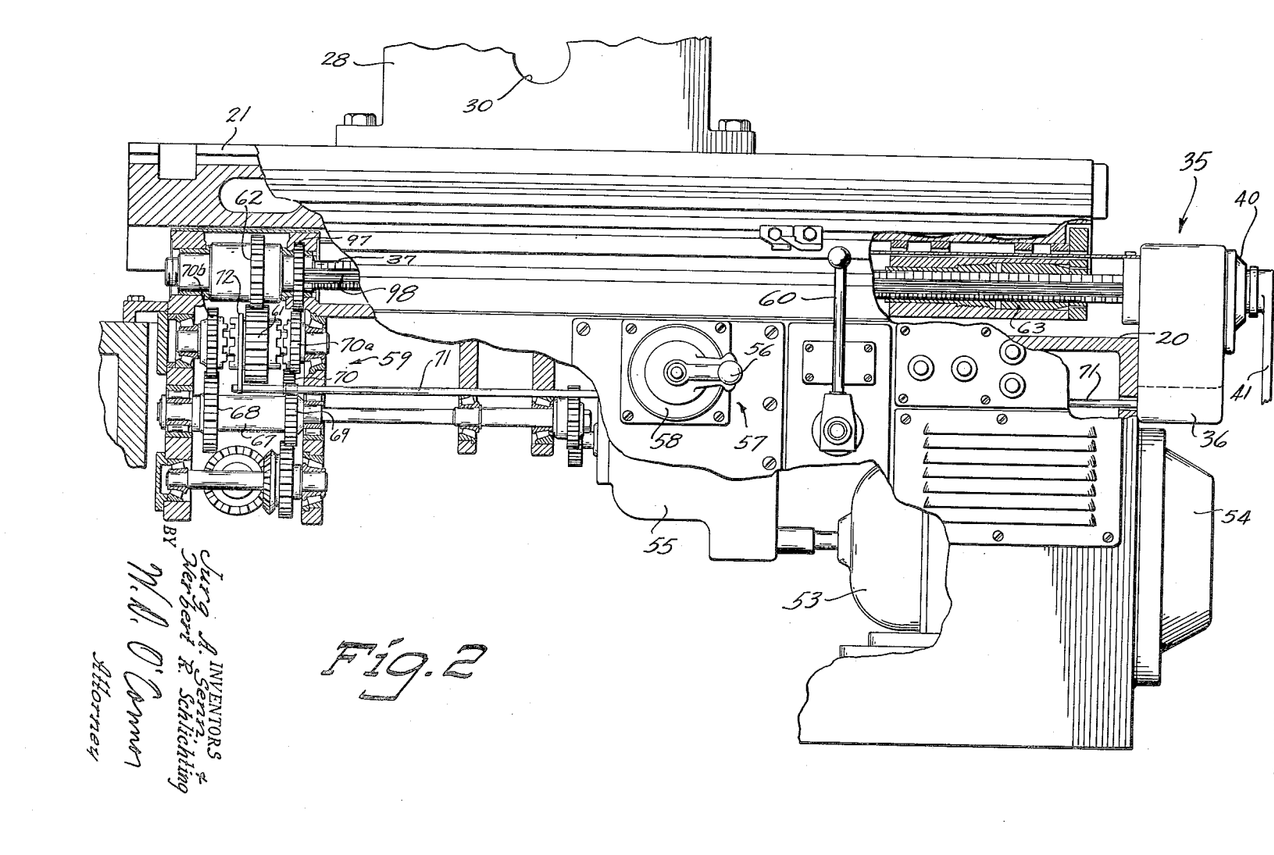
Fig. 2 is a view of the front of the bed and table, part in elevation and part in section showing the power drives for the table.

Referring to the drawings and more particularly to Figs. 1 and 2 thereof, the precision positioning mechanism is shown incorporated into the structure of a milling and boring machine. The application of the mechanism to this type of machine tool structure presented a means of providing a complete disclosure of a practical apparatus embodying the invention. The invention can be just as readily utilized to precisely position any other movable member of a machine tool such as the cutter retaining head assembly in the machine tool disclosed herein.

As shown, the machine comprises essentially a hollow bed or base 20 having a work supporting table 21 slidably mounted on the top thereof. The base 20 constitutes the foundation or frame of the machine and provides a housing for the table power drive mechanism and other control units. As shown in Fig. 1, the base 20 is provided with a laterally projecting bed extension 22 adapted to slidably support a spindle head column 23. A spindle head 24 is slidably mounted for vertical movement on the column 23. The spindle head 24 is a self-contained power driven unit including a horizontally movable quill 25 and a rotatably supported cutter driving spindle 26. A cutter 27 retained in the spindle 26 is disposed to operate on a workpiece 28 clamped on the table 21. With this arrangement, the position of the spindle 26 and the cutter 27 may be readily adjusted in either a vertical or horizontal plane in a well known manner. The power rotation of the cutter 27 may be coordinated with the rate of advancement of the quill 25 to provide means for precision threading operations. A detailed description of the construction and operation of the machine tool hereinbefore described is disclosed in patent application Serial No. 680,256 filed June 28, 1946, now Patent No. 2,605,678 issued Aug. 8, 1952 and constituting an invention of Joseph B. Armitage and Orrin W. Barker.

In performing a boring or threading operation upon a workpiece, it is often necessary to move the workpiece to one of a plurality of positions relative to the cutter 27. For example, with the workpiece 28 shown in Fig. 1, it is necessary to effect alignment three times in order to accurately position the cutter relative to each of three holes 29, 30 and 31 to be bored therein. The alignment of the holes relative to the cutter in a horizontal plane is accomplished by selectively positioning the table 21. While, heretofore, the positioning of the table for such machining operations was effected in a well known manner by power feeding the table to within the approximate range of the desired position and, thereafter, precisely positioning the table through the manual manipulation of a hand crank, a fully automatic precision positioning mechanism 35 is herein disclosed to facilitate exact positioning of the table. This arrangement provides means for positioning the table more rapidly and more precisely and is particularly advantageous when a plurality of workpieces must be machined in an identical matter.

Figure 3:
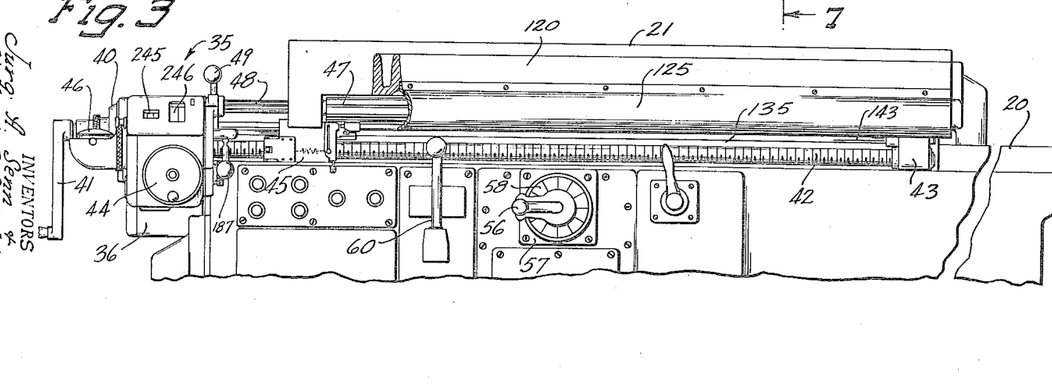
Fig. 3 is a rear elevational view of the bed and table assembly showing the precision screw and nut assembly together with the trip dog control drum mounted thereon.

The positioning mechanism 35 is conveniently mounted on the upper end of the bed 20 for ready accessibility to the machine operator. A portion of the mechanism is enclosed in a casing 36 attached to the bed 20, as shown in Figs. 1 and 2. A table screw 37, journalled in the bed 20 and disposed to effect the manual or power movement of the table 21 along a pair of parallelly disposed way surfaces 38 and 39 in a well known manner, is power driven by means of a motor driven transmission contained within the bed 20. The left end of the table screw 37 as viewed in Fig. 3, is rotatably journalled within the casing 36 and is provided with a dial mechanism 40 on the extending end thereof. The dial mechanism bears the well known indicia which may be read against a zero mark on the casing to indicate the position of the table 21. A crank handle 41 is selectively clutchable to the table screw 37 and serves to provide means for manually effecting movement of the table longitudinally along the ways on the bed 20.

A precision screw 42, as shown in Figs. 1 and 3, is parallelly disposed to the table screw 37 and to the path of table travel. The precision screw 42 is journalled in a bracket 43 movably mounted on the bed 20 and is journalled at its other end within the casing 36. The precision screw 42 may be selectively rotated through the manipulation of a hand wheel 44, in a manner to be hereinafter more fully described, and effect selective positioning of a precision nut assembly 45. The precision screw 42 is disposed for precise axial movement to operate automatic control mechanism within the casing 36 and to actuate a dial indicator 46 mounted for ease of readability on the side of the casing 36. The precision nut assembly 45 is operatively engaged by any one of a plurality of trip dogs selectively positionable on a drum assembly 47 slidably mounted for unitary movement with the table 21 on a splined shaft 48 journalled in the positioning mechanism casing 36, as shown in Fig. 3. Any of the trip dogs on the drum 47 may be positioned to engage the precision nut 45 through the manipulation of a handle 49 which serves to index the splined shaft 48. The adaptation of the disclosed positioning mechanism 35 to a machine tool enables the operator to selectively position the table at any one of a plurality of positions as may be required to perform a series of machining operations upon a workpiece 28 mounted on the table 21. After each of the trip dogs on the drum 47 have been carefully positioned to effect the precise positioning of the table 21 at a predetermined point of travel, it is merely necessary to operate the positioning mechanism, as hereinafter described, to bring the table into the desired position. A high degree of repetitive accuracy in positioning is thus assured each time the mechanism is used. One of the advantages of the invention is that once all of the trip dogs have been selectively positioned to define a positioning function, it is possible to advance from one position to the next without returning to the basic reference point.

As shown in Fig. 2, the table 21 is power driven from a motor 53 operatively mounted within the bed 20 and accessible through a louvered door 54 hinged to the left end of the bed. The motor 53 is connected to drive a fixed step transmission 55 unitarily mounted within the bed 20. The operating feed range of the transmission 55 is comparatively broad with the individual feed rates being selectable through the manipulation of a handle 56 operably mounted on a feed rate selector 57. The selected feed rate is determinable by reading a dial 58 in a well known manner. The transmission 55 is connected to drive a table reverser mechanism 59. The reverser mechanism 59 is selectively operable to drive the table in either direction and is controlled through the manipulation of a handle 60 conveniently disposed on the side of the bed 20. The direction of handle manipulation in a plane parallel to the bed 20 determines the direction of table travel. As shown in Figs. 1 and 2, the handle is disposed in a neutral position with selective movement of the handle to the left serving to institute leftwardly table movement and selective rightward movement of the handle from the neutral position serving to institute rightwardly table movement. The handle 60 is connected through linkage mechanism, not shown, to effect axial movement of a clutch gear 61, constituting a portion of the table reverser mechanism 59 in a well known manner, to provide a power drive to a table drive gear 62 keyed to the table screw 37. This gear serves to drive the table screw 37 at any of the selected feed rates and effect movement of the table 21 by means of a connection thereto comprising an anti-backlash nut assembly 63 threadably connected to the table screw and operatively attached to the table. The aforedescribed power drive to the table screw 37 is used for milling operations on the milling and boring machine but is never used in conjunction with the hereinafter described operation of the precision positioning mechanism 35.

When the table 21 is to be advanced from one position to another under the control of the automatic precision positioning mechanism 35, the table is always power driven at a traversing rate and through an auxiliary drive train. The power for the traversing drive originates from the motor 53 contained within the base 20. The traversing drive originates within the transmission 55 and provides a faster driving rate to the table 21 than any of those provided by the aforedescribed plurality of feed rates. The drive is connected to the reverser mechanism 59 via a gear cluster 67 comprised of a pair of gears 68 and 69 disposed to drive a pair of gears 70a and 70b. The gear 68 serves to provide a power drive in one direction for the reverser mechanism 59, while the gear 69 meshing with an intermediate gear 70 serves to provide power drive in the opposite direction to the reversing mechanism in a well known manner. Selective positioning of the clutch gear 61, in turn, serves to determine the direction of table screw rotation and the direction of table movement at any given instant. As aforementioned, the selective axial positioning of the clutch gear 61 in the reversing mechanism 59 is controlled by the shifter handle 60. As shown in Fig. 2, the shifter handle is connected by a linkage mechanism (not shown) to a shifter rod 71 disposed in the bed 20 for axial movement whenever the shifter handle is moved sideways from the neutral position shown. A shifter fork 72 keyed to the end of the shifter rod 71 is disposed to constantly engage the clutch gear 61 in a well known manner and cause a corresponding axial movement of the gear when the handle 60 has been manipulated.

Assuming that the operator is desirous of moving the table from one position to the next under control of the positioning mechanism, it is necessary for him to manipulate the handle 60 in a plane transverse to the plane of movement used to control directional table travel, and thereby move the handle forwardly to actuate the traversing drive after he has manipulated the handle in a plane longitudinal to the bed 20 to select either direction of table travel. When this occurs, the table will be driven at traversing rate until it comes within range of a preselected position at which point a pretrip mechanism, to be hereinafter more fully described, is rendered operative to stop further table movement at traversing rate. Note that the positioning mechanism 35 is rendered operative only when the table moves in a leftwardly direction.

Figure 4:
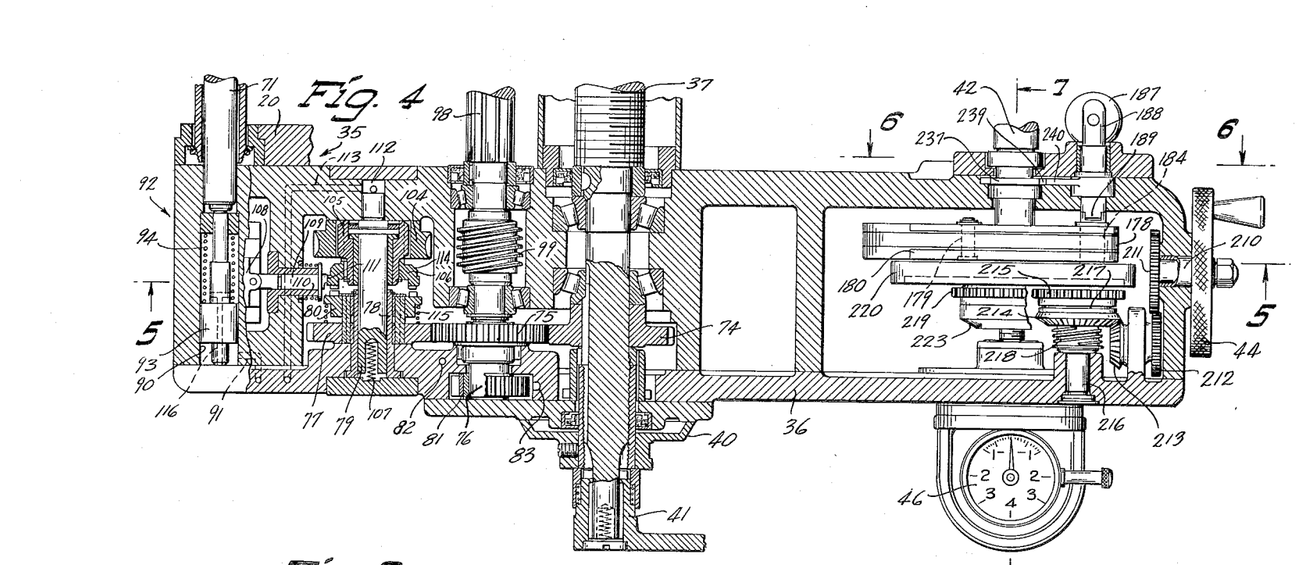
Fig. 4 is a detailed view in horizontal section of the end bracket power drive and control assembly.
Figures 5, 6:
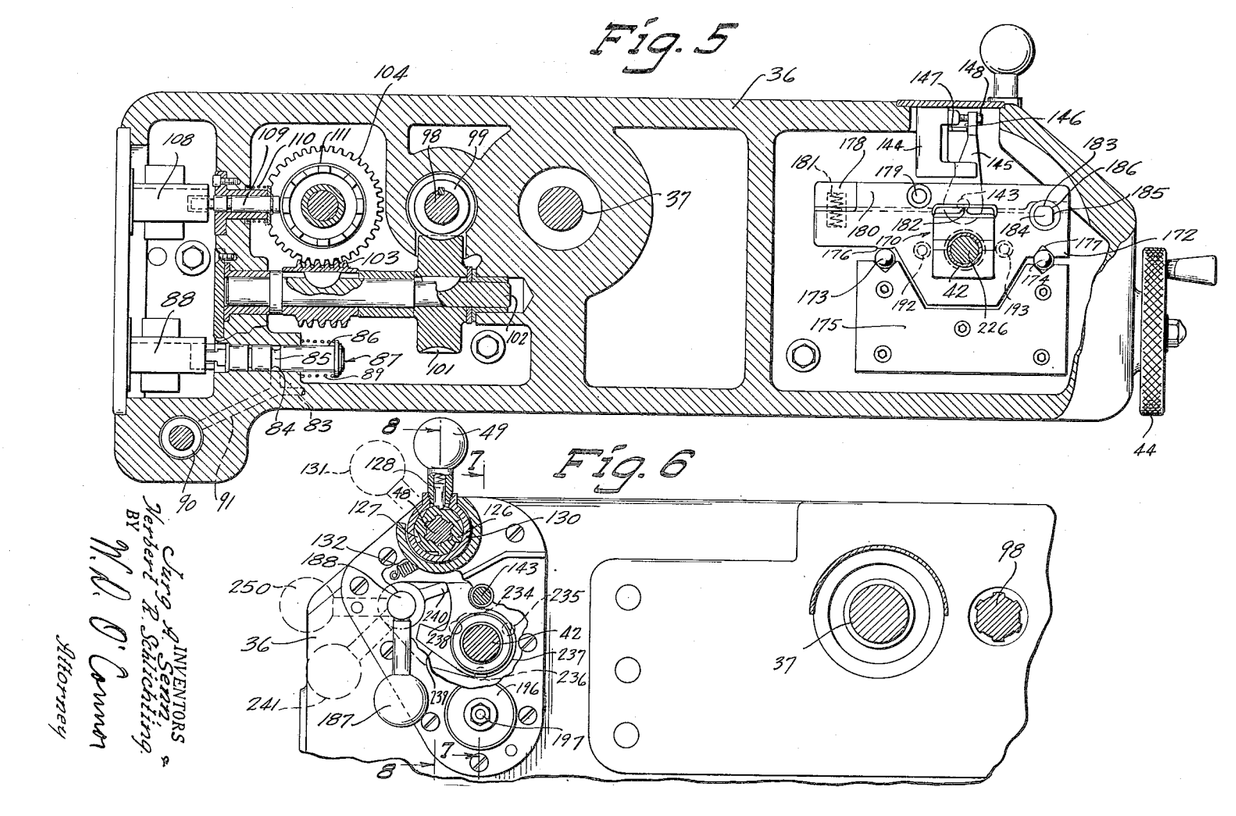
Fig. 5 is a vertical sectional view of the end bracket assembly taken on the plane of lines 5—5 in Fig. 4 showing a portion of the power drive and control mechanisms.
Fig. 6 is a side elevational view of a portion of the positioning mechanism taken on the plane represented by lines 6—6 in Fig. 4.

The table screw 37 is journalled in the end bracket casing 36, as shown in Fig. 4, with the dial 40 and the crank handle 41 operatively mounted on the end thereof. A gear 74 keyed to the table screw 37 meshes with and drives an intermediate gear 75 keyed on the end of a sleeve 76 journalled within the front cover of casing 36. The gear 75, in turn, meshes with a gear 77 slidably mounted on a splined sleeve 78 which is rotatably mounted and retained against axial movement on a hollow stub shaft 79. A clutch element 80 is also mounted on the splined sleeve 78 in a manner to permit automatic ratcheting to occur within the range of one clutch tooth when the clutch element 80 is engaged. When the table 21 is driven at traversing rate, the gears 75 and 77 together with the clutch element 80 are driven by the table screw 37. At this time, the gear 75 is also driving a gear type hydraulic pump 81 via sleeve 76. The pump 81 serves to supply a hydraulic control circuit with hydraulic fluid from a sump (not shown) within the casing 36 via an intake line 82. During normal operations at rapid traverse rate, the hydraulic fluid from the pump 81 is conducted via a line 83 to a port 84 operatively disposed to connect with an annular groove 85 on a piston 86 constituting a part of an electrohydraulic actuating control valve 87, as detailedly shown in Fig. 5. As long as a solenoid 88 operatively connected to the end of the piston 86 remains unenergized, the piston 86 will be retained in the position shown in Fig. 5 by means of a spring 89. With the piston 86 in this position, the hydraulic fluid from the pump 81 will be exhausted via the annular groove 85. When the pretrip control mechanism is rendered operative through the engagement of one of the trip dogs with the precision nut assembly 45, in a manner to be hereinafter more fully explained, the solenoid 88 is electrically energized to move the piston 86 leftwardly from the normal operating position shown in Fig. 5, whereby the port 84 conducting the hydraulic fluid from the pump 81 is momentarily blocked to effect a fluid hammer surge to the hydraulic fluid in the end of a cylinder 90 via a conductor 91, as shown in Figs. 4 and 5. The cylinder 90 horizontally disposed in the lower portion of the end bracket casing 36, constitutes a portion of a control rod shifter valve 92. As shown in Fig. 4, a piston 93 disposed for axial movement in the cylinder 90 is normally retained in the non-operative position shown therein by means of a spring 94 abutting the piston. However, the sudden fluid hammer surge imparted to the hydraulic fluid in the cylinder 90, upon the operation of the control valve 87, causes the piston 93 to be moved inwardly from the position shown in Fig. 4 against the pressure of the spring 94. Since the upper end of the piston 93 is constantly disposed to abut the end of the shifter rod 71, the movement of the piston will cause the rod to be shifted axially a predetermined distance and thereby cause the clutch gear 61 in the table reverser mechanism 59 to be shifted to the neutral intermediate position shown in Fig. 2. At the same time, the axial movement of the shifter rod 71 serves to actuate the linkage mechanism (not shown) to return the handle 60 to the neutral position. Thus, the power drive train to the table screw 37 is broken and further power movement of the table 21 at traversing rate is halted. It should be remembered that this occurs when the table comes within a prescribed range of a desired true position necessary for a given boring or other machining operation. A few microseconds after the rapid traverse power drive is broken, the hydraulic hammer surge is transmitted through the lines to the pump 81. The pressure build-up and the surge working against the pump teeth produces a braking action on the screw 37 and the table 21. This action further impedes movement of the table through the added absorption of kinetic energy by the stalling action on the pump 81.

An auxiliary power drive train is thereafter utilized to drive the table screw 37 and effect further power movement of the table 21 until it has reached the precise position required for the boring or machining operation. The auxiliary drive train consists of a gear 97 keyed to the end of an auxiliary splined drive shaft 98 and meshing with the gear 70a in the table reverser mechanism 59. Since both of the drive gears 68 and 69 in the reverser mechanism will continue to be power driven from the motor 53 even though the aforedescribed rapid traverse drive train to the table screw 37 has been interrupted, the auxiliary drive shaft 98 driven from the gear 70a will continue to rotate under power drive. The splined shaft 98 is disposed parallelly to the table screw 37 with the other end thereof being journalled in the end bracket casing 36, as shown in Fig. 4. The end of the auxiliary shaft 98 rotatably supports the sleeve 76 on which the gear 75 and the hydraulic pump 81 are mounted. Keyed to the shaft 98 within the casing 36 is a worm 99 which meshes with and drives a worm wheel 101 keyed to a transverse shaft 102 journalled within the casing. The shaft, in turn, drives a worm 103 keyed thereto which meshes with and drives a worm wheel 104 splined on a yoke 105 rotatably journalled on the clutch shaft 79. A second clutch element 106 keyed on the yoke 105 is disposed upon axial displacement to mesh with the clutch element 80. Since the yoke 105 is locked on the shaft 79 to prevent axial movement thereon, the two clutch elements 80 and 106 will normally remain disengaged by means of a spring 107 which operates to separate the clutch elements. While the table 21 is being driven at traversing rate, the auxiliary shaft 98 will continue to drive the clutch element 106, as aforedescribed, but at a speed rate considerably less than the speed rate at which the clutch element 80 is driven by the table screw 37, and so calculated that the random positioning error of the table is such that it is held within tolerated limits.

When the pretrip control mechanism electrically energizes the solenoid 88 and thus operates the control valve 87, as aforedescribed, a trigger solenoid 108, which is normally energized to withdraw a plunger 109 to the position shown in Fig. 5, is simultaneously deenergized to release the plunger. A spring 110 is operatively disposed to force the plunger 109 outwardly against a shoulder 111 on the second clutch element 106. The tip of the plunger 109 will continue to ride on the shoulder 111 while the clutch element 106 is rotatably driven and until the shaft 79 is axially displaced because of the increased hydraulic pressure in cylinder 112 against the pressure of the spring 107. When the control valve 87 is actuated upon the operation of the pretrip mechanism, the hydraulic hammer surge is transmitted via a line 113 connecting with the cylinder 112 operatively disposed at the inner end of the shaft 79. The increased pressure within the cylinder is sufficient to effect axial shifting of the shaft 79 and the clutch element 106 in a manner to engage the clutch teeth on the clutch elements 80 and 106. The design of the clutch teeth is such that interference between the two greatly differing speeds is eliminated. When this occurs, the plunger 109 is forced forwardly by the spring 110 to engage a latching shoulder 114 on the periphery of the clutch element 106 and lock the element in an engaged position. If the clutch teeth abut each other when they are first engaged, the clutch element 80 is provided with a ratching spring 115 which permits a ratcheting effect to occur until the clutch teeth on the two elements are fully engaged. Thereafter, the auxiliary power drive is connected to rotatably drive the gears 77, 75 and 74 in a manner to effect power rotation of the table screw 37 at a considerably lower speed rate and thereby cause the table 21 to be power driven until the declutching mechanism is actuated. The speed of the gear 75 and the hydraulic pump 81 when driven from the auxiliary power drive train is considerably less then when driven by the traversing drive and, consequently, the oil pressure in the lines connecting with the control valve 87, control rod shifter valve 92 and the cylinder 112 will be reduced materially. However, the resiliently retained latch 109 will cause the two clutch elements 80 and 106 to remain engaged until such a time in the control cycle at which the trigger solenoid 108 is reenergized to withdraw the plunger 109. The reduction of hydraulic pressure in the cylinder 90 associated with the control rod shifter valve 92 will allow the piston 93 to be slowly returned to the aforementioned inoperative position under the resilient urging of the spring 94. A drilled orifice 116 in the piston 93 permits the hydraulic fluid to escape from the cylinder 90 to the sump (not shown) at a controlled rate and thereby serves to control the rate of piston return.

As previously mentioned, the control of the precision positioning mechanism is designed to operatively control movement of the work retaining table 21 and the workpiece from a predetermined reference point at a traversing rate to a point within the proximity of the first precision position required for a machining operation on the workpiece. At this point, a pretrip mechanism operates to disconnect the traversing drive and institute a slow speed power drive whereby the table is again driven at a reduced power rate to within proximity of the true position. When this proximity is reached, the slow speed power drive is disconnected at the precise moment required to finally position the table at the true position after the dissipation of its vested kinetic energies. Since the control mechanism hereinafter detailedly described is designed to control the precision positioning of a movable machine tool element at any one of a plurality of selected positions, the same general procedure must be followed after the machining operation at the first position has been completed. Thus, the traversing drive will again be utilized to drive the table 21 until it has reached the proximity of the second selected position whereat this drive will be disconnected and an auxiliary drive will be utilized to motivate the table to within a prescribed range of the second true position. Thus, it should be apparent that the table may be precisely positioned for a series of machining operations at various selected points on a workpiece 28 and that the variance between positions on a plurality of similar workpieces will be held at an irreducible minimum.

Figure 8:
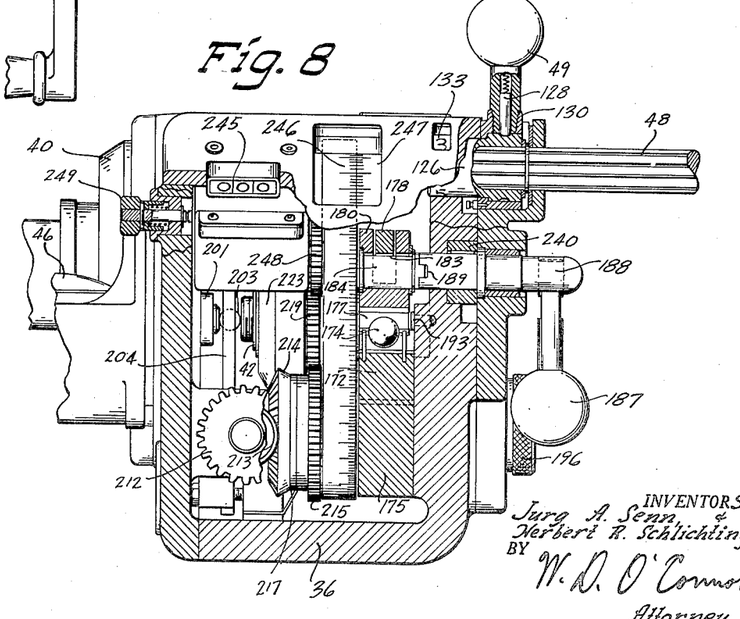
Fig. 8 is a vertical sectional view of a part of the end bracket assembly taken on the plane of lines 8—8 in Fig. 6.
Figure 9:
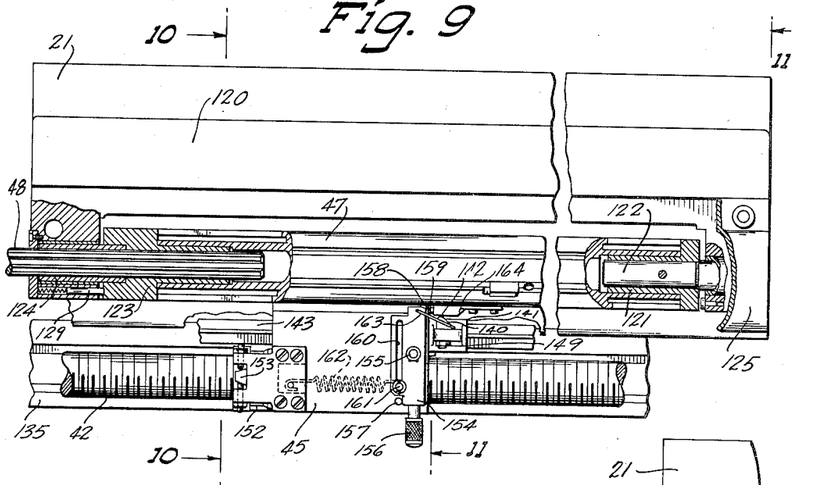
Fig. 9 is an enlarged detailed view of part of the precision screw and the nut and trip dog assembly.
Figure 10:
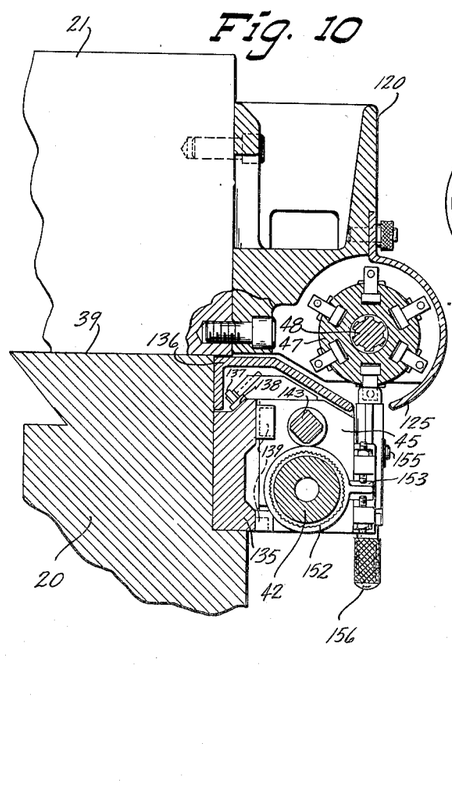
Fig. 10 is a vertical sectional view on the plane represented by the line 10—10 in Fig. 9 and showing the precision screw and nut.

Each of the positions at which the table 21 is to be precisely stopped for a machining operation is selectively determined by the position of trip dogs on the drum assembly 47, as shown in Fig. 3. The drum assembly is rotatably journalled on the back side of a coolant trough 120 bolted to the rear of the table 21, as shown in Figs. 3 and 10. As viewed in Fig. 9, the right end of the drum 47 is rotatably journalled on a sleeve bearing 121 supported on a stub shaft 122 anchored beneath the trough 120 while the left end of the drum is mounted on a sleeve bearing 123 rotatably supported on the end of a hollow stub shaft 124. A semi-circular guard 125 is bolted to the longitudinal side of the trough 120 and provides a shield over the trip dog drum 47 during machining operations. A splined ratchet shaft 48 extends through the hollow stub shaft 124 and is splined to the sleeve bearing 123 which, in turn, is keyed to the trip dog drum 47. The extreme left end of the ratchet shaft 48 is splined in a bearing 126 rotatably journalled in the end bracket casing 36, as shown in Figs. 6 and 8. A portion of the bearing 126 is provided with a series of ratchet notches 127, as shown in Fig. 6, which are disposed to be engaged by a plunger 128 resiliently retained within an index handle 49 extending beyond the top of the casing 36. The handle 49 is threadedly retained in a sleeve 130 rotatably mounted on a portion of the bearing 126. A detent mechanism 129 mounted in the left end of the trough 120 and operative on notches in the drum 47, as shown in Fig. 9, retains the drum in alignment with the notches 127 on the bearing 126.

In the particular structure shown, the bearing 126 is provided with six ratchet notches 127 which correspond, and are in alignment, with the six trip dog locating T-slots on the drum assembly 47. When the handle 49 is in the upright position shown in Fig. 6, it serves to retain the ratchet shaft 48 and the drum 47 splined thereto against rotation. However, when the handle is manually manipulated in a counterclockwise direction to the dotted position 131 shown in Fig. 6, it serves to effect a corresponding rotation of the dog retaining drum 47 whereby the next trip dog locating T-slot is brought into alignment for operation relative to the precision nut 45. A spring 132 anchored within the casing 36 and attached to the sleeve 130, serves to return the handle 49 and the sleeve 130 to the upright position without effecting any change in the rotative position of the ratchet shaft 48. An indicating numeral 133, as shown in Fig. 8 and viewed through an opening in the casing 36, serves to indicate the position of the trip retaining drum assembly 47. The indicating numerals are stamped on the outer periphery of the bearing 126 splined to the ratchet shaft 48. In this manner, the machine operator is always aware of the position of the trip dog drum 47 relative to the nut 45.

The precision screw 42 is rotatably disposed in a plane parallel to that of the splined ratchet shaft 48 on the longitudinal side of the bed 20. As detailedly shown in Figs. 9, 10 and 11, a straight edge 135 is attached to the longitudinal top edge of the bed 20 and is disposed along side the way surface 39. The straight edge serves to support the precision screw 42 and the precision nut 45 so that both operate in precisely parallel planes at all times. A longitudinal guard plate 136, bolted to the side of the bed 20 directly above the straight edge 135, affords protection to the straight edge and to the precision screw and nut assembly. If any article is dropped or if chips resulting from a machining operation are forced off of the top of the table 21, they are deflected by the shield or guard 136 away from the screw and nut mechanism.

Figure 11:
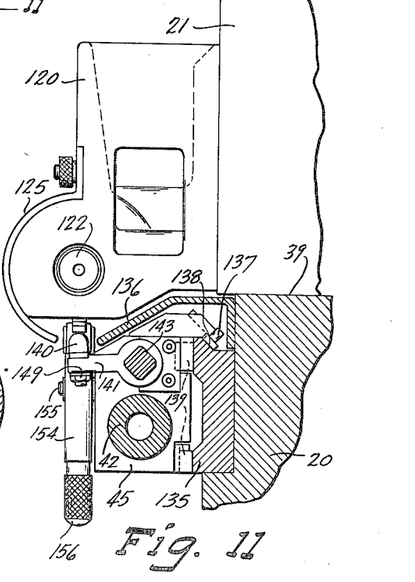
Fig. 11 is another vertical sectional view taken on the plane of lines 11—11 in Fig. 9 and showing a portion of the precision nut and screw assembly.

The left end of the precision screw 42 as viewed in Fig. 3, is mounted for selective rotation and axial movement within the end bracket casing 36 while the right end of the screw is journalled in a bearing mounting bracket 43 operatively carried to constantly engage the side face of the straight edge 135. The bracket 43 and the precision nut 45 are operatively mounted on the straight edge 135 in an identical manner. While the mounting of the bracket 43 is not detailedly shown, the mounting of the nut 45 is shown in Figs. 10 and 11. A pair of rollers 137 jounalled in the top of the precision nut frame are disposed to roll along an upper inclined surface 138 on the straight edge 135. The rollers 137 serve to retain the nut 45 in constant alignment with the straight edge. Other rollers 139 rotatably mounted in the back face of the nut 45 are disposed to roll along the face of the straight edge. Thus, the precision nut is restrained against all movement except in a plane parallel to the precision screw 42. In a like manner, the mounting of the bearing carrier 43 is such as to permit free axial movement of the precision screw 42 but serves to restrain movement in all other directions except to retain contact with the face of the straight edge.

Any selected trip dog on the drum assembly 47 may be positioned, as aforedescribed, to engage a cam 140 adjustably attached to the top face of a pretrip lever 141 mounted for free rotation in the side of the precision nut 45, as shown in Figs. 9 and 11. The pretrip lever is restrained against longitudinal movement relative to the nut 45. As the cam 140 engages a pretrip cam surface 142 on the leading bottom longitudinal face of the trip dog, the pretrip lever 141 is forced downwardly from the nonoperative position shown in Fig. 11 until the lever is made to rotate in the precision nut 45. Since a squared or splined pretrip shaft 143 is operatively mounted to extend longitudinally through the nut 45 and engage correspondingly shaped internal surfaces in the pretrip arm 141, the rotation of the pretrip arm will cause simultaneous rotation of the shaft 143 therewith. The right end of the shaft 143 as viewed in Fig. 3, is rotatably journalled in the bearing mounting 43, while the left end of the shaft is journalled within the end bracket casing 36 and is disposed therein to effect the operation of a pretrip control switch 144, as detailedly shown in Figs. 5 and 7.

A pretrip switching lever 145 keyed to the left end of the pretrip shaft 143 within the confines of the casing 36 is provided with a contact surface 146 normally disposed to retain a contact plunger 147 on the pretrip microswitch 144 in the depressed position shown in Fig. 5. A set screw and lock nut 148 threadedly mounted in the end of the pretrip switching lever 145 affords means for adjusting the degree of depression of the plunger 147 when engaged by the contact surface 146 on the arm 145. Whenever the cam surface 140 on the pretrip lever 141 is not engaged by one of the trip dogs, the plunger 147 on the microswitch 144 is retained in the depressed position. However, when the trip dog engages the cam on the pretrip lever 141 to effect rotation of the pretrip shaft 143, the pretrip switch arm 145 will be rotated clockwise from the vertical position shown in Fig. 5 to release the plunger 147 and effect a pretrip electrical switching function whereby the solenoid 88 will be energized to actuate the control valve 87 and the solenoid 108 will be deenergized to release the clutch latching plunger 109, as aforedescribed. The cam surface 140 on the trip lever 141 is adjustable by means of an adjustment screw and nut 149 and serves to provide means for varying the time and distance variable between the pretrip and final positioning functions of the precision nut 45.

The actual contact between the precision screw 42 and the precision nut 45 is obtained through a climb cut nut 152, as shown in Figs. 3, 9 and 10, which is adapted to threadably engage the screw 42 in a well known manner. An adjustment mechanism 153 mounted on the nut serves to provide means for a precise adjustment between the threads of the nut 152 and of the screw 42. Thus, when the screw is manually rotated to effectively move the nut along its threaded surface, it is accomplished with the assurance that an error of axial movement therebetween is not introduced in positioning the machine tool member 21.

Normally, a reference point lever 154 is pivotally retained on a pin 155 in the vertical position shown in Figs. 9 and 11. The lever 154 is provided with a handle 156 for manually returning the lever to a vertical position against a reference point pin 157 anchored in the body of the nut 45 which serves to prevent clockwise rotation of the lever 154 beyond the vertical and true reference position. A contact surface 158 on the top leading edge of the lever 154 is designed to be in alignment with the trip dog in the bottom slot on the drum assembly 47. When the contact surface 158 is engaged by a contact button 159 attachedly mounted on the side of the trip dog, under normal operating conditions at a reduced feed rate the engagement is merely sufficient to effect axial movement of the precision screw 42 and operate control mechanism associated therewith in a manner to be hereinafter more fully described. However, when the two surfaces engage under a slightly greater impact, or if through malfunction the low speed drive should not be disengaged at the desired point, the reference point lever 154 will be forced to pivot in a counterclockwise direction about the pin 155 as viewed in Fig. 9. A slot 160 in the lever is disposed to slidably retain a pin 161 attached to a spring 162 securely anchored on the outer side of the precision nut 45. The spring and slot mechanism serves as a safety tripping mechanism to completely pivot the lever 154 out of engaging position with the contact button 159 on the trip dog. Thus, the reference point lever 154 will be quickly removed from the path of trip dog travel and will remain in the horizontal inoperative position until manually returned to the vertical position, as aforementioned. A snap spring 163 fastened to the upper end of the lever 154 is designed to be manually hooked in a groove 164 on the back side of the trip dog and serves to carry an unclamped trip dog along in its respective groove on the drum assembly 47 while in contact with the surface 158 on the reference lever for set-up purposes to be hereinafter more fully described.

Figure 7:
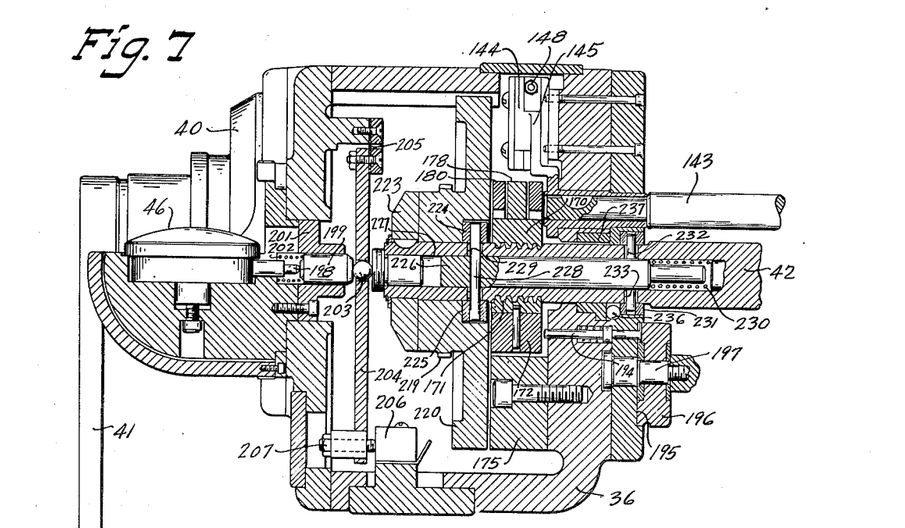
Fig. 7 is an enlarged detailed view of the control mechanism associated with the precision screw and taken on the plane represented by lines 7—7 in Figs. 4 and 6.

The left end of the precision screw 42 as viewed in Figs. 3 and 7, is operably retained in a multiple grooved thrust bearing 170 precisely held in a series of corresponding grooves 171 on the end of the shaft. The bearing 170 is comprised of an upper and lower section, as shown in Fig. 5, which are operably retained in a yoke 172 movably mounted on a pair of balls 173 and 174 to permit unitary movement in a plane parallel to the axis of the precision screw. The balls 173 and 174 are carried in constraining V-grooves on a support plate 175 fixedly mounted within the casing 36. A flat contact surface 176 on the yoke 172 is adapted to engage the top of the ball 173 while a constraining V-groove 177 in the yoke 172 serves to engage the top of the ball 174. This varied arrangement of contacting surfaces for each of the balls provides a means for automatic lateral adjustment of the yoke 172 in conformity with axial movement of the precision screw 42 while preventing any transverse movement of the yoke which might result from possible radial movement of the precision screw.

While the upper portion of the multiple grooved thrust bearing 170 is retained in the yoke 172 for vertical movement, it is restrained against sidewise movement through engagement with the grooves 171 in the precision screw 42. The upper portion of the bearing 170 is engaged by a horizontally disposed brake lever 178, as shown in Figs. 5, 7 and 8, pivotally mounted on a pin 179 fixedly mounted in a slotted portion 180 of yoke 172. As shown in Fig. 5, the lever 178 is loaded at its left end by a spring 181 which tends to impart a normal clockwise movement to the lever about the pin 179. The lever 178 is disposed to rest on a raised nodule 182 centrally disposed on the top member of the thrust bearing 170 in a plane coinciding with the axial plane of the precision screw 42. The spring 181 serves to maintain the lever 178 in constant contact with the nodule 182 and force the upper half of the bearing into locking engagement with the precision screw 42. As shown in Fig. 5, a flat 183 constituting a portion of a barrel cam 184 engages with a horizontal undersurface on the right end of the lever 178. A second flat 185 when disposed to engage the lever 178 serves to operate in the same capacity as the flat 183 whereat the full force of the spring 181 on the lever 178 is imparted to the upper portion of the thrust bearing 170 and serves to lock the precision screw 42 against rotation. However, when the cam 184 is rotated to position where a high point 186 of the cam intermediate the flats 183 and 185 is disposed to engage the lever 178 and force it upwardly against the pressure of the spring 181, the pressure on the upper portion of the bearing 170 will be relieved whereby the precision screw 42 will be free to rotate in the bearing.

Rotation of the barrel cam 184 to position the cam in one of three positions whereat either of the three cam surfaces 183, 185 and 186 are disposed for effective operation of the lever 178, as aforedescribed, is effected through the selective manipulation of a clutch and brake control lever 187. The control lever 187 is threadedly retained in the extending end of a shaft 188 journalled in the end bracket casing 36, as shown in Fig. 8. The inner end of the shaft 188 is provided with a clutch slot 189 which is adapted to engage a corresponding clutch tongue on the right side of the barrel cam 184 as viewed in Fig. 8. With the control lever 187 in the downward vertical position shown therein, the cam flat 183 will be disposed to engage the lever 178 and impart a clamping action upon the precision screw 42.

The thrust bearing 170 and the yoke 172 may be selectively displaced in a plane corresponding to the axis of the precision screw 42 in a manner to effect five adjustable and selective axial displacements of the precision screw. As shown in Figs. 5 and 8, a pair of reference point pin heads 192 and 193 are press anchored in the side wall of the casing 36 and act as precision abutments for the yoke 172. All precision settings of the precision mechanism are computed on the assumption that the thrust bearing 170 and the yoke 172 are initially positioned to permit engagement between the yoke and the heads of the reference point pin 193. In order to effect selective axial adjustment of the screw 42 and yoke assembly 172, a contact plunger 194, as shown in Fig. 7, is disposed for axial movement in a plane coinciding with the plane of movement of the yoke and the screw with one end engaging the side of the yoke. The plunger is spring biased to retain it in the most rightwardly extended position. The other end of the plunger 194 is disposed to engage a cam surface 195 on the back side of a microadjustment handle 196 rotatably mounted on an extending stub shaft 197 anchored in the side of the casing 36. By manipulating the handle 196, the plunger 194 will be forced inwardly to push the yoke 172, the thrust bearing 170 and the precision screw 42 and thereby effect selective precise axial displacement of the precision screw 42.

The dial indicator 46 operatively mounted in the side of the casing 36 is readily disposed for indicating the axial displacement of the precision screw 42. A stem 198 on the indicator is disposed to constantly rest against the end of a contact plug 199 slidably mounted for endwise movement in a mounting bracket 201, as shown in Fig. 7. The plug 199 is preloaded by a spring 202 to resiliently force the plug into engaging contact with a ball 203 retained in a final position switching lever 204. Thus, it is evident that any axial displacement of the precision screw 42 will be immediately indicated on the dial indicator 46. As viewed in Fig. 7, the spring 202 operative on the contact plug 199 provides a continuous rightwardly bias of the thrust bearing and precision screw against the reference point pin heads 192 and 193, as shown in Fig. 8. The spring loading on the contact plug 199 is sufficiently great to prevent any movement of the screw when the trip dog engages the pretrip lever cam 140 or which might result from vibration during a heavy cutting operation. Any axial movement of the precision screw and the yoke away from the reference point heads 192 and 193 will be immediately indicated on the dial of the indicator 46.

The same axial movement of the precision screw 42 will likewise serve to actuate the final position switch arm 204 in which the ball 203 is retained. The upper end of the switch arm is mounted on a spring hinge 205 consisting of a flexible spring fixedly attached to the casing 36 and to the upper end of the arm 204. Movement of the precision screw and ball 203 is consequently transmitted to the arm 204 which serves to actuate a final position microswitch 206 mounted within the casing 36. An adjustable set screw and lock nut 207 affords a means for varying the action of the arm 204 relative to the plunger of the switch 206. Because of the mechanical advantage gained through the lever 204, the most minute movement of the ball 203 in the arm 204 will be multiplied to actuate the switch 206 which serves to halt the slow speed power movement of the table 21 as effected through the auxiliary drive train to the positioning mechanism. The actuation of the switch 206 also serves to reset the precision control mechanism for a subsequent positioning cycle.

Positioning from an inital or basic reference point to a point of true or final position is effectively controlled with each setting of a trip dog. Each dog is disposed to first initiate a transition from a traversing rate of table movement to a slow speed rate of table movement when the table comes within a prescribed range of the final position. Thereafter, the dog initiates a control movement serving to terminate the control function as the contact button 159 on the trip dog engages the contact surface 158 on the reference point lever 154 operatively mounted on the precision nut 45. This movement serves to actuate the final positioning switch 206 which electrically disconnects the mechanical drive to the table. After the table and workpiece have come to rest, the true or final position is obtained as indicated by the dial indicator. From the time when a particular trip dog first engages the contact surface 158 on the lever 154, all table movements and control functions are of a constant nature with the exception of certain uncontrollable random errors which are designed to be less than the allowable positioning tolerances imposed on the machine.

All of the control mechanism is under constant elastic constraint at the instant at which the electrical final position switch 206 is actuated to initiate the discontinuance of the slow speed power drive and thereafter, the energy is dissipated in effecting table movement to the final position. The distance of such table movement is constant and has superimposed thereon an erratic uncontrollable error which is inherent in the positioning mechanism 35. Once this error has been determined in setting up a particular positioning cycle, it will remain constant and is automatically compensated for at this time.

Rotative movement of the precision screw 42 may be precisely effected by means of the hand wheel 44 keyed to an extending hub 210 of a gear 211 as shown in Fig. 4. The gear 211 meshes with and drives a gear 212 which is disposed to drive a bevel gear 213. The bevel gear 213, in turn, meshes with and drives a complementary bevel gear 214 rotatably mounted on the extending hub of a gear 215 rotatably carried on a shaft 216 fixedly mounted in the side wall of the casing 36. A clutch disk 217 disposed between the side faces of gears 214 and 215 serves to normally transmit rotative force from the gear 214 to the gear 215. The rated strength of a spring 218 disposed to abut the side of the gear 214 serves to determine the load which the clutch disk 217 will carry without slipping. If an excessive amount of force is imparted to the hand wheel 44, or if any of the mechanism driven by the gear 215 is locked against rotation, the clutch disk 217 will slip and prevent injury to the mechanism. The gear 215 meshes with a gear 219 integrally formed on the hub of a circle plate 220 rotatably mounted on the end of the precision screw 42 adjacent the thrust bearing 170, as shown in Figs. 4 and 7.

A thrust plate 223 is rigidly keyed to the end of the precision screw 42 directly adjacent to the circle plate 220. The circle plate may be selectively locked to rotate with the precision screw or may be rotated independently thereof. Selective operation of the circle plate is effected through the manipulation of the clutch and broke control lever 187. The manipulation of this lever serves to simultaneously operate the braking mechanism on the precision screw 42 and to control the operation of the circle plate 220 thereon. As shown in Fig. 7, a circle clutch pressure plate 224 is disposed to engage a clutch contact face 225 on the side of the circle plate 220. When pressure is applied to the clutch plate 224, it serves to force the plate 220 into contact with the thrust plate 223 and lock it in this position. When this has been done, the circle plate 220 will be locked to rotate with the precision screw 42. Thus, the manipulation of the hand wheel 44 geared to drive the circle plate 220, as aforedescribed, will also serve to effect rotation of the precision screw 42 when the precision nut 45 is to be positioned. The circle clutch pressure plate 224 is actuated by means of an internal plunger 226 disposed for axial movement in a concentrically disposed bore 227 in the precision screw 42. A pin 228 mounted transversely in the plunger 226 extends therefrom through a diametral slot 229 in the precision screw into the circle clutch pressure plate 224. A spring 230 abutting against the right end of the plunger 226 as viewed in Fig. 7, serves to normally force the plunger 226, pin 228 and clutch plate 224 leftwardly whereby the circle plate 220 will be forced into abutting engagement with the thrust plate 223 and, consequently, will rotate therewith.

Endwise movement of the internal plunger and the clutch pressure plate against the opposition of the spring 230 is effected through a circle clutch release ring 231 slidably mounted for axial movement on the periphery of the precision screw 42. The ring 231 is connected to the internal plunger 226 by means of a pin 232 transversely mounted therein and which extends through a diametrical slot 233 in the side walls of the precision screw 42. The inner side face of the release ring 231 is engaged by three balls 234, 235 and 236, operably retained in holes in the rear cover of the end bracket casing 36. The three balls are disposed to engage the camming grooves in the side face of a circle clutch control cam 237, as shown in Figs. 6 and 7. The control cam 237 is carried for rotative movement on the periphery of the precision screw 42 with rotation thereof from the position shown in Fig. 7 serving to force the three balls against the side of the release ring 231 in a manner to move the internal plunger 226 rightwardly and thus release the pressure on the clutch plate 224. When this occurs, the circle plate 220 is no longer forced against the thrust plate 223 and, consequently, is free to rotate independently of the precision screw 42. The independent rotation of the circle plate 220 may then be accomplished through the manipulation of the hand wheel, as aforementioned.

Rotation of the circle clutch control cam is accomplished by means of a second camming surface 238 integrally formed on an extending lobe 239 on the peripheral side of the control cam 237, as shown in Fig. 6. The camming surface 238 is engaged by a cam actuating arm 240 keyed on the shaft 188, as shown in Figs. 4, 6 and 8. With the clutch and brake control lever 187 in the vertical position shown in Fig. 6, the cam arm 240 will engage the camming surface 238 on the control cam 237 in a position to release the three balls 234, 235 and 236 from engagement with the circle clutch release ring 231. Thus, the spring 230 is free to force the plunger 226 and the clutch pressure plate 224 into engagement with the circle plate 220 whereby the circle plate will rotate with the precision screw 42. At the same time, the precision control mechanism is disposed to provide for normal engagement of the thrust bearing 171 with the precision screw 42 and impart a braking action thereto. The control handle 187 is always retained in this position while the positioning mechanism is adapted to effect automatic positioning of a power driven machine tool member.

When setting up the positioning mechanism, it is necessary to effect positioning of the precision nut 45 on the screw 42. This is accomplished by shifting the control handle 187 to the intermediate 45° position indicated by the dotted circle 241. With the handle 187 in this position, the shaft 188 will be rotated to effect engagement of the high portion 186 of the barrel cam 184 with the lever 178, whereby the pressure on the upper portion of the thrust bearing 170 is relieved and the precision screw 42 is free to rotate. At the same time, the cam arm 240 will be moved along the cam surface 238 to a position whereat the circle clutch control cam 237 is positively locked against any rotative movement. Thus, the circle plate 220 remains locked to the precision screw 42 although the thrust bearing brake 170 has been released to permit rotation of the screw. The hand wheel 44 may be manipulated to effect rotation of the circle plate 220 and the precision screw 42 and thereby cause the precision nut 45 to be moved along the precision screw.

The amount of linear movement of the precision nut 45 is readily ascertainable by reading a counter 245 together with indica 246 on the outer periphery of the circle plate 220 against a stationary vernier scale 247 attached to the casing 36. The counter 245 is operably driven via a gear 248 meshing with the gear 219 integrally formed on the hub of the circle plate 220. Since the precision screw is a five pitch screw, each half revolution of the screw and circle plate will result in one count on the counter 245. Thus, the counter serves to give a reading in inches and tenths of inches. The indicia 246 on the periphery of the circle plate 220 is graduated in two hundred divisions to indicate precision screw movement in thousandths of an inch. When the indicia 246 is read against the stationary vernier scale 247, an additional reading in tenths of a thousandth of an inch is obtainable. Therefore, a direct reading of the counter, circle and vernier will give a cumulative reading of any nut movement in inches, tenths, hundreds, thousandths and tenths of a thousandth. Thus, the operator may readily ascertain the amount of precision nut movement from any given reference point by observing the reading on the counter 245 and the indicia 246 when read against the vernier scale 247. A resiliently clutched reset knob 249 connected to the counter 245, as shown in Fig. 8, enables the operator to reset the counter reading as desired.

If it is necessary to zero the indicia 246 on the periphery of the circle plate 220 while setting up a precision positioning cycle, the operator need only shift the clutch and brake control lever 187 to the horizontal position indicated by dotted lines 250 shown in Fig. 6. The barrel cam 184 will then be positioned to engage the flat 185 with the lever 178 whereby the multiple grooved thrust bearing 170 is clamped to prevent rotation of the precision screw 42. Movement of the control lever 187 to the horizontal position likewise causes the cam actuating arm 240 to be rotated and engage a portion of the cam surface 238 to effect a partial rotative movement of the control cam 237. As viewed in Fig. 6, the control cam 237 will be rotated counterclockwise and cause the camming surfaces on the side face thereof to force the three balls 234, 235 and 236 into engagement with the release ring 231 whereby the internal plunger 226 and the clutch pressure plate 224 will be actuated to release the circle plate 220. Thus, the circle plate 220 is free to be rotated independently of the precision screw 42 through the manipulation of the hand wheel 44 as aforedescribed, and the scales thereon may be set to provide any particular reading necessary for setting up the automatic precision positioning cycle.

For example, in setting up the machine to perform a series of boring operations on the workpiece 28 as shown in Fig. 1, it would be necessary to make the following adjustments to the precision positioning mechanism 35 whereby it would be possible to accurately position the table 21 and the workpiece 28 precisely at each of three positions to bore each of the holes 29, 30 and 31. After the positioning mechanism 35 had been predeterminately adjusted to provide the desired positioning cycle, the operator would be assured that the spacing between each of the holes would be precisely accurate on all of the similar workpieces subsequently machined.

After bolting the workpiece on the table 21 and mounting the proper cutter 27 in the spindle, the operator is ready to set up the automatic positioning cycle required to perform a series of machining operations upon the workpiece. Generally, the location of the holes to be bored is established from some other point on the workpiece such as a machined edge or surface. Thus, in setting up a positioning cycle, it is necessary to establish a basic reference point on the workpiece from which all dimensional movements are begun. This point is referred to as the basic reference point. With the dog retaining drum assembly 47 positioned to present one of the trip dogs in an operative position relative to the precision nut 45, the trip dog is clamped at any convenient position and the table 21 is power driven at rapid traverse rate in a leftwardly direction until the trip dog engages the nut to effect a positioning function of the positioning mechanism, as aforedescribed. This is done while the control lever 187 is in the vertical position shown in Fig. 6 whereat the braking effect is applied to the precision screw 42 and the circle plate 220 is locked for unitary rotation therewith. This serves to establish the constant errors inherently present in the positioning control mechanism. After the positioning mechanism has functioned in the usual manner, the dial indicator 46 must be reset to a zero reading. At the same time, the counter 245 as well as the indicia 246 on the circle plate 220 should be reset to zero.

Afterwards the table 21 supporting the workpiece 28 must be moved to bring the basic reference point into exact alignment with the center line of the cutter retaining spindle 26. This may be accomplished through the use of an indicator, center scope or other precision measuring instrument in a well known manner. Thereafter, the trip dog may again be loosened from the dog retaining drum assembly 47 and fastened to the reference lever 154 by means of the spring clip 163. The hand wheel 44 is then manipulated to effect rotation of the precision screw 42 whereby the precision nut 45 with the trip dog fastened thereto may be moved to any convenient position. The selected position of the precision nut 45 should be one at which all of the precision locating trip dogs may be rendered operative to institute a positioning function through engagement with the precision nut 45 in the aforedescribed manner. By manipulating the microadjustment handle 196 it is possible to axially displace the precision screw 42 a distance sufficient to again zero the dial indicator 46. The trip dog should then be clamped to the drum assembly and the spring clip 163 released therefrom. The microadjustment knob 196 is thereafter returned to the neutral position. This particular trip dog is thereafter known as the reference point trip dog and can be readily used at any time to control the operation of the positioning mechanism in effecting the repositioning of the table and workpiece at the basic reference point relative to the cutter. The control lever 187 should then be moved to the horizontal position and the counter 245 and the indicia 246 on the circle plate 220 again set at zero.

The aforedescribed procedure in setting up a positioning cycle on the machine tool must be initially performed whenever the positioning mechanism 35 is used. The basic reference point on the workpiece 28 relative to the cutter 27 is established by this procedure and all further movements of the table during the positioning cycle will be determined from this reference point. It is advisable in machining subsequent workpieces requiring the same positioning cycle of operation, that the table 21 be returned to the reference point as determined through the engagement of the reference point trip dog with the aforedescribed mechanism on the precision nut 45 in effecting a positioning function.

If the positioning mechanism 35 is to be used to precisely establish the proper table positions for machining a single workpiece, the following procedure should be followed since it is not necessary to selectively position the other trip dogs on the drum assembly 47. With the counter 245 and the indicia 246 on the circle plate 220 set to read zero, the control lever 187 is shifted to the dotted position 241 indicated in Fig. 6, whereat it is possible to manipulate the hand wheel 44 and effect movement of the precision nut 45 along the screw 42 any desired precise distance as indicated by the readings on the counter, circle plate indicia and vernier. The desired distance as thus selected corresponds to the distance of the first machining operation on the workpiece 28 from the aforementioned basic reference point thereon. The control lever 187 must then be returned to the vertical position whereat the precision screw 42 is locked against rotation and the circle plate 220 is likewise clamped to the screw. Thereafter, the control handle 69 is manipulated to initiate leftwardly travel of the table at traversing rate. Such table movement will continue until the reference point trip dog strikes the pretrip cam on the pretrip lever 141 to start the slow speed positioning movement of the table. Movement will continue until the trip dog strikes the reference point lever 154 and displaces the precision screw 42 axially to actuate the final positioning switch 206 and halt all power movement of the table. The table 21 will come to rest at the true position as indicated by the dial indicator 46. The required machining operation may then be performed on the workpiece 28 through the manipulation of the controls on the spindle head 24 in a well known manner. After the machining operation has been completed, the precision nut 45 may conceivably be again advanced to another position on the precision screw 42 in the same manner as previously described to establish a second machining position for the table 21. The table 21 would then be advanced at rapid traverse rate to a position whereat the trip dog would institute a second positioning function and effect precision positioning of the table for the second machining operation.

However, if the precision positioning mechanism 35 is to be utilized for a production cycling operation wherein the table 21 must be repeatedly positioned at each one of a series of selected positions for machining operations on a plurality of workpieces, each of the trip dogs must be accurately positioned on the drum 47. It should be noted from Fig. 10 that the trip dog drum 47 is provided with six T-slots each of which has a trip dog adjustably mounted therein. Consequently, it is possible to set up a production positioning cycling operation on the machine requiring up to a maximum of six positions for various machining operations. After the workpiece has been bolted to the table 21 and the reference point trip dog has been fastened to the drum assembly 47 to establish a basic reference point for the table and workpiece as previously described, the positioning mechanism may be set for any desired cycling operation. The control lever 187 is shifted to the upper horizontal position at which it is possible to zero the circle plate indicia 246 and the counter 245 associated therewith. Generally, the trip dog in the number one T-slot on the drum 47, as indicated by the numerical indicia 133, readily observable and operative upon the manipulation of the indexing handle 49, is used to establish the basic reference position of the table and workpiece.

The trip dog in the number two T-slot on the drum 47 is generally utilized to control the precise positioning of the table 21 necessary to perform the first machining operation upon the workpiece 28. Thus, it is necessary to manipulate the indexing handle 49 in a manner to effect rotation of the trip dog drum 47 and position the trip dog in the second slot in alignment for operation upon the precision nut 45. Thereafter, the dog must be loosened from the drum, moved into engagement with the contact surface 158 on the reference lever 154 and retained in an engaged position therewith by means of the spring clip 163. With the clutch and brake control handle 187 positioned as indicated by the dotted lines 241 whereat the circle plate 220 is disposed for unitary rotation with the precision screw 42, the hand wheel 44 is manipulated to effect movement of the precision nut 45 on the screw 42 a prescribed distance from the reference point as readily determinable by reading the counter 245 and the circle plate indicia 246. With the nut 45 thus positioned, the microadjustment knob 146 is rotated to force the precision screw 42, circle plate 220 and the yoke 172 forward axially until the dial indicator 46 is set at a zero reading. This compensates for the constant errors previously mentioned in the positioning control mechanism and insures repeated accurate positioning of the table and workpiece. Thereafter, the trip dog is securely fastened to the drum assembly 47 and the snap spring 163 is released therefrom. The microadjustment knob 196 may then be returned to the neutral position. Thus the second trip dog is accurately positioned to control the precision positioning of the workpiece 28 for the first machining operation. Whenever this trip dog engages the actuating mechanism on the precision nut 45 during leftwardly travel of the table as viewed in Fig. 3, the control mechanism 35 will operate to effect the positioning function for precisely positioning the table for the first machining operation.

Subsequent precise positions of the table 21 required for additional machining operations upon the workpiece 28 may be established by repeating the aforedescribed procedure and using another trip dog on the drum 47 for each of the required positions. By observing the trip dog indicia 133, it is possible to readily ascertain which of the trip dogs is operatively positioned to institute a positioning function. Manipulation of the indexing handle 49 serves to selectively move any one of the positioned trip dogs on the drum 47 into a position at which it is disposed to actuate the automatic control mechanism associated with the precision nut 45. The table 21 is generally clamped at each of the selected positions in order to insure accuracy in the performance of the machining operation upon the workpiece 28.

Once all of the positions are established for a desired production cycling operation upon a given workpiece, it is necessary to return the table 21 supporting the workpiece 28 to the basic reference position as previously established. The nut 45 is positioned to engage the first trip dog to reestablish the basic reference position. The brake and clutch control lever 187 is then returned to the lower vertical position whereat the nut 45 is retained in the selected position. By manipulating the indexing handle 49, each of the previously positioned trip dogs on the drum assembly 47 is sequentially indexed into an operative range relative to the precision nut 45. Thereafter, the control handle 60 must be manipulated to initiate leftwardly table movement as viewed in Fig. 2.

By repeating this procedure each time a machining operation has been completed, a series of positioning functions will occur each of which will serve to precisely position the table for a particular machining operation. Each of these functions will serve to effect operation of the pretrip and final position switches within the positioning mechanism and effectively position the table and workpiece. It is well to note that the positioning mechanism has been adjusted to compensate for the constant errors which are inherent to the control mechanism and which may possibly vary due to variations in the weight of the workpiece on the table and other variable conditions. However, once this inherent constant error is established for a particular positioning cycling operation, the error will remain the same and is automatically compensated for upon the occurrence of each positioning function.

The positioning mechanism 35 may also be readily utilized when effecting the manual manipulation of the hand crank 41. In this case, the workpiece is mounted on the table for a machining operation and the positioning function is made to occur to determine the constant error in the control mechanism as aforedescribed. Thereafter, the position of one of the trip dogs on the drum assembly 47 is established to determine the basic reference point of the table 21 and workpiece 28 relative to the center line of the tool retaining spindle 26. Thus, if the precision nut 45 is precisely moved along the precision screw 42 in the same manner as previously described in order to establish a precise distance from the established basic reference point, it is possible to manually manipulate the crank 41 and effect rotation of the table screw 37 until the table 21 is moved the desired distance to bring the trip dog into engagement with the contact surface 158 on the reference point lever 154. The operator need only to observe the reading on the dial indicator 46 and continue table movement until the indicator needle is positioned to read zero.

It is to be understood that the aforedescribed invention as utilized to automatically control precise positioning of a work retaining table on a milling machine, may also be readily adapted to control other movable machine tool members, such as the tool retaining spindle head 24 slidably mounted on the column 23 in the aforedescribed machine tool. The positioning mechanism 35 could also be utilized to control the precise positioning of movable members on other types of machine tools with equal utility and accuracy.

Figure 12:
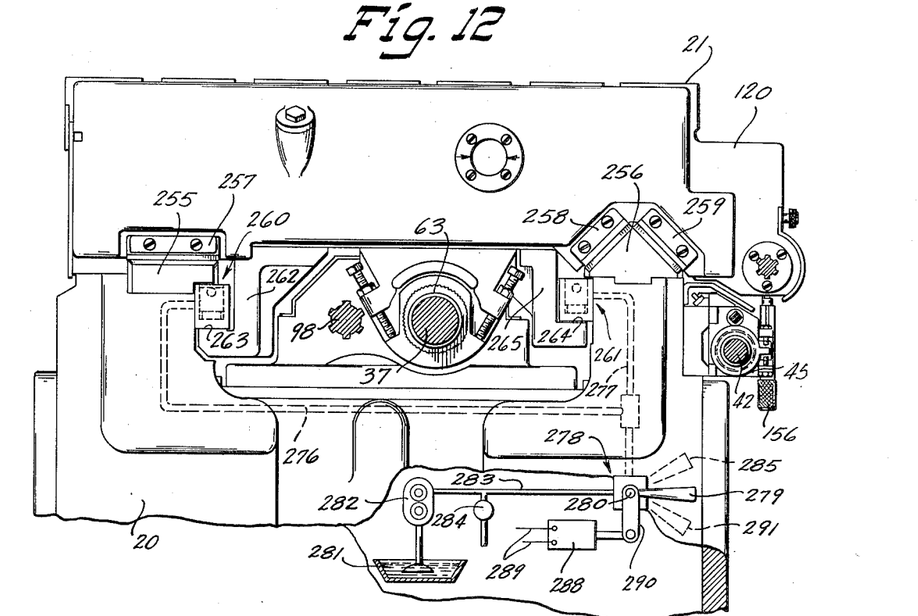
Fig. 12 is an end elevational view of the bed and table assembly with the positioning mechanism removed to show a modified arrangement of table mounting, together with hydraulic clamping means therefor; and, Fig. 13 is an enlarged detailed view of one of the hydraulic clamping means contained within the bed.

The previously described means for mounting the table 21 on the bed 20 is of the conventional type generally used in machine tool construction. While this method is satisfactory for general machining operations, it was deemed advisable to develop a table mounting which would prevent the table from becoming misaligned or shifted whenever the table is clamped to the bed 20 during a machining operation. The modified type of table mounting and clamping, as shown in Fig. 12, constitutes a left end view of the bed and table assembly with the positioning mechanism end bracket unit 36 removed therefrom. The front side of the table 21 is supported on a flat way 255 fixedly anchored to the bed 20 while the rear of the table 21 is slidably supported on a V-way 256 fixedly mounted on the bed 20. The way surfaces on the underside of the table 21 are precision scraped to insure full surface contact with the ways 255 and 256. A chip wiper 257 attached to the table 21 and disposed to engage the way 255, serves to remove chips therefrom as the table 21 is moved while the chip wipers 258 and 259 attached to the table 21 are disposed to engage the V-way surface 256 and serve in the same capacity thereon. The utilization of the two types of ways 255 and 256 assures absolute parallel alignment of the table 21 with the bed 20 and absolute transverse alignment between the table and the tool retaining spindle.

With this type of table mounting, it is possible to provide for absolute control of the clamping of a movable machine tool member. The conventional type of clamping tends to induce a transverse force which serves to effect a slight misalignment of the table whenever the clamping mechanism is operated. For the type of table mounting used in the modified form, it is possible to accurately clamp the table member 21 with the clamping forces being induced transversely to the plane of table travel. In this manner, the table can be securely clamped to the bed 20 with the assurance that canting or misalignment does not occur.

A pair of clamping mechanisms 260 and 261 are longitudinally mounted in the bed 20 directly beneath the ways 255 and 256, respectively. The front side of the table 21 is provided with an L shaped flange 262 extending the length of the table and having a horizontal contact surface 263 disposed to slidably engage the bottom face of the clamping mechanism 260. Likewise, the bottom face of the clamping mechanism 261 is disposed to engage a contact surface 264 on a downwardly projecting flange 265 integrally formed with the table 21. Thus, the contact surfaces 263 and 264 on the flanges 262 and 265, respectively, are always disposed to engage a portion of the associated clamping mechanisms 260 and 261, respectively, regardless of the longitudinal position of the table 21 on the ways 255 and 256. It should be noted that this structure does not in any way interfere with the operation of the table screw 37 and the nut assembly 63.

Figure 13:
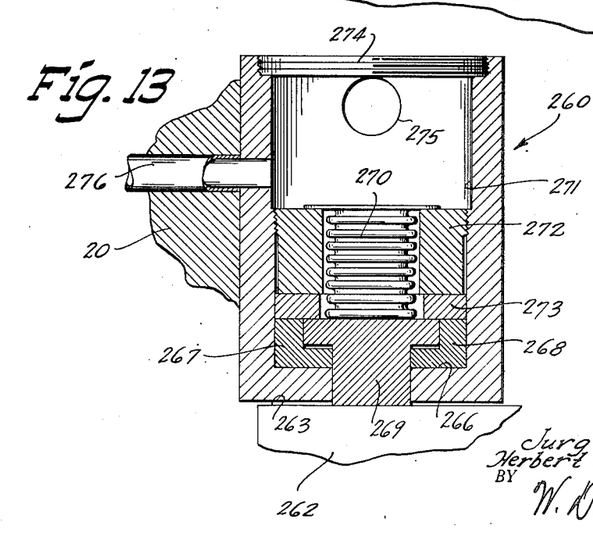

Since the operating mechanism within each of the clamping bars 260 and 261 is identical, only one will be described in detail with specific reference being made to the enlarged detail view shown in Fig. 13. A T-slot 266 machined in the bottom face of the clamping bar is disposed to receive a pair of retaining bars 267 and 268 which serve to support a T-contact bar 269 having the stem portion longitudinally disposed and extending through the bottom of the clamping bar. Thus, the bottom surface of the contact bar 269 will engage the contact surface 263 on the L shaped flange 262 integrally formed with the table 21. As viewed in Figs. 12 and 13, the contact bar 269 is disposed for limited vertical movement and is positively restrained against endwise movement by means of a pair of end plate clamps (not shown). It is obvious that pressure imparted to the contact bar 269 will bring the bar into full bearing engagement with the contact surface 263 while the release of pressure on the top of the bar 269 will permit the latter to be raised slightly and reduce the degree of contact with the surface 263 on the flange 262.

The application of pressure to the top of the contact bar 269 is accomplished by means of a plurality of hydraulically actuated metal bellows 270 operatively disposed at spaced intervals in vertical wells 271 along the entire length of the clamping mechanism 260. The bottom of each bellows 270 rests on the top of the contact bar 269 while the top flange thereof is supported on the top edge of a ring nut 272 threadably locked in position within the well 271. A packing ring 273 serves to prevent the escape of hydraulic fluid onto the contact bar 269 and the flange 262. The top of each well 271 is enclosed by means of a plug 274 threadably retained in the clamping mechanism 260. A horizontally disposed hydraulic passage 275 conducts hydraulic fluid to each of the wells 271. This serves to equalize the pressure on all of the metal bellows 270 disposed in the plurality of wells throughout the length of the clamping mechanism 260. The amount of pressure imparted to the contact bar 269 increases directly with the pressure of the hydraulic fluid in each of the wells 271. Thus, the table 21 may be partially or fully clamped against all movement to the bed 20 or released for longitudinal movement along the ways 255 and 256.

The clamping mechanism 260 is supplied with hydraulic fluid from a line 276 while the clamping mechanism 261 is supplied from a line 277. Both of the hydraulic lines 276 and 277 are connected to a multiple control valve 278 conventionally disposed on the back side of the bed 20 adjacent to the controls for the positioning mechanism 35. The control valve 278 is designed to admit hydraulic fluid to actuate the clamping mechanisms for one of three conditions. The valve is manually operable through the manipulation of a control handle 279 pivotally mounted on a pin 280 anchored in the body of the valve. With the handle 279 disposed in the horizontal position shown in Fig. 12, the hydraulic fluid under limited pressure is directed to the clamping mechanisms 260 and 261 and imparts a partial load on the contact bar 269. This load is of sufficient magnitude to retain the table 21 in snug contact with the ways 255 and 256 but not of sufficient magnitude to lock the table against movement.

Hydraulic fluid for the clamping mechanism is obtained from a sump 281 conventionally disposed in the bed of the machine and pumped therefrom by a gear type pump 282, the output of which is directed into the control valve 278 via a line 283. A relief valve 284 in the line 283 serves to limit the maximum pressure of the hydraulic fluid. If the control handle 279 is manipulated to the upper position indicated by the dotted lines 285, the hydraulic flow is completely interrupted by the valve 278 to fully release the contact bars 269 in each of the clamping mechanisms 260 and 261. Generally, the lever is moved to the upper position when the machine tool is to be used for regular machining operations without the utilization of the previously described positioning mechanism 35.

However, when the table 21 is positioned through the operation of the precision positioning mechanism 35, the lever 279 is shifted to the aforedescribed horizontal position whereat the hydraulic clamping mechanisms 260 and 261 serve to impart a partial pressure on each of the contact bars 269 and thus reduce to a minimum any stray movement of the table assembly 21 except for the longitudinal movement imparted through the power drive connected thereto. After the table has been precisely positioned for a given machining operation, a solenoid 288 is automatically energized via wires 289 to actuate linkage mechanism 290 and effectively shift the control lever 279 to the lower position indicated by dotted lines 291 in Fig. 12. With the control handle 279 in this position, hydraulic fluid under full pressure from the pump 282 will be directed to each of the clamping mechanisms 260 and 261. Full pressure is hydraulically imparted to the metal bellows 270 which serve to actuate the bellows and force the entire length of the contact bars 269 downwardly under maximum pressure. The two contact bars 269 will each engage their respective contact surfaces 263 and 264 on the flanges 262 and 265, respectively, with sufficient pressure to lock the table 21 against all movement. The table 21 will remain clamped while the machining operation is performed. The deenergization of the solenoid 288 will serve to release the handle 279 for automatic return to the horizontal position shown in Fig. 12 upon the initiation of a succeeding positioning function under the control of the positioning mechanism 35. When the machine tool is not under the control of the positioning mechanism 35, the solenoid 288 remains unenergized and the control handle may be readily manipulated to either of the three aforementioned positions. Thus, the table may be selectively released, partially loaded under clamping pressure, or fully clamped. It is to be understood that the mounting and clamping means herein disclosed as applicable to a movable work retaining member, may be individually or collectively applied to other movable machine members with equal advantage.

From the foregoing explanation of the construction and operation of the precision positioning mechanism on a machine tool and exemplifying the present invention, it will be apparent that there has been provided an improved and novel means for effecting precise positioning of movable machine tool members. The positioning mechanism may be utilized to effectively operate in positioning a single workpiece or a plurality of workpieces requiring a plurality of machining operations. In either case, it is possible to advance from one selected position to another without returning to the initial or basic reference position. Instead, a continuing positioning cycle is set up and utilized.

Although the illustrative embodiment of the invention has been set forth in considerable detail by way of disclosing an operative mechanism for practicing the invention, it is to be understood that the particular apparatus shown and described is intended to be illustrative only and that various features of the invention may be incorporated in other structural forms without departing from the spirit and scope of the invention as defined in the subjoined claims.

The principles of the invention having now been fully explained in connection with the foregoing description of illustrative embodying apparatus, the invention is hereby claimed as follows:

1. In a positioning mechanism for a machine tool, a frame and a carriage movably mounted on said frame, driving mechanism connected to effect movement of said carriage relative to said frame, a pump operatively connected to be driven by said carriage driving mechanism upon movement of said carriage, a source of power selectively connectible to actuate said carriage driving mechanism a disconnecting means disposed between said power source and said driving mechanism, and control apparatus responsive to movement of said carriage and operative to react upon said pump in a manner to check movement of said carriage and through variation of pressure fluid from said pump to operate said disconnecting means and disconnect said source of power from said carriage driving mechanism.

2. A positioning mechanism to control precise positioning of a movable machine tool member and comprising a control element, a power driven drive screw operatively connected to said element, an auxiliary power drive connected to said element, a clutch mechanism operatively disposed between said auxiliary drive and said power driven screw, a precision screw operatively disposed for axial and rotative movement in said control element, a precision nut threadedly disposed on said screw, a trip dog retaining drum rotatably mounted on the movable machine member, a plurality of trip dogs selectively positionable on said drum with each being disposed to be selectively indexed to engage said precision nut at a predetermined point of travel of the movable member, a pretrip mechanism associated with said precision nut and operative within said control element to disrupt the power drive to said power screw and to operate said clutch to engage said auxiliary drive, and final positioning control means operative from said precision screw and nut to effect final selective positioning of the movable machine member.

3. A machine tool comprising a frame, a carriage movably mounted on said frame, driving mechanism arranged to effect actuation of said carriage, a pump directly connected to be driven by said carriage driving mechanism whenever said carriage is actuated, a second power operated driving apparatus for actuating said carriage, a hydraulically actuated clutch selectively engageable to connect said second power driving apparatus to said driving mechanism to actuate said carriage, a pressure fluid circuit operatively connected between said pump and said clutch and including a normally open discharge valve, and a control system selectively operable to react upon said pump in a manner to stop movement of said carriage as actuated by said driving mechanism and to close said discharge valve thereby establishing pressure to effect engagement of said hydraulically actuated clutch.

4. In a positioning mechanism for a movable machine tool carriage, an actuating apparatus operatively connected to move said carriage, a power operated driving mechanism, a clutch selectively engageable to connect said power operated mechanism to drive said actuating apparatus to move said carriage, hydraulically actuated means operatively connected to effect disengagement of said clutch selectively, a positive displacement pump directly connected to be driven by said carriage actuating apparatus, a control circuit connected to receive hydraulic fluid from said pump and deliver it to said hydraulically actuated clutch disengaging means, said circuit including a normally open discharge valve, and a control system selectively operable to close said discharge valve for restricting the discharge of fluid therefrom thereby establishing pressure in said circuit to actuate said clutch disengaging means and react upon said pump to stop said carriage.

5. In a positioning mechanism for a movable machine tool member, a base, an end bracket control unit fixedly mounted on said base, a feed screw journalled in said base and in said end bracket, a power source contained in said base and disposed to selectively drive said screw, a movable machine tool element slidably mounted on said base and operatively driven by said screw, an auxiliary power drive connected to said power source and selectively disposed to drive said screw independently thereof, a precision screw operatively mounted in said end bracket for axial and rotative movement, a precision nut threadably retained for selective positioning on said precision screw, a plurality of position determining trip dogs carried on said movable member, a pretrip control mechanism contained in said end bracket and operatively controlled from said precision nut to disrupt the power drive to said first-named screw and to initiate a power drive via said auxiliary drive train to effect further member movement at a reduced positioning rate, and final positioning control means operative upon axial movement of said precision screw to effect final positioning of said movable member on said base.

6. In a machine tool, a frame, a carriage movably mounted on said frame, driving mechanism operatively connected to effect traversing movement of said carriage relative to said frame, a pump operatively driven by said carriage driving mechanism whenever said carriage is moving at traversing rate, a power driving train including a normally engaged hydraulically actuated clutch operatively connected to actuate said driving mechanism for moving said carriage at a selected traversing rate, a second power driving train including a normally disengaged hydraulically actuated clutch selectively operative to actuate said driving mechanism for moving said carriage at a positioning rate, a hydraulic circuit interconnecting said pump with said two hydraulically actuated clutches, a normally open discharge valve connected in said circuit, and a control apparatus operative to close said discharge valve selectively thereby establishing pressure in said circuit to disengage said normally engaged carriage operating clutch and thereby exert back pressure on said pump for stopping said carriage and to engage said normally disengaged carriage positioning clutch for advancing said carriage at positioning rate for carriage positioning purposes.

7. In apparatus for automatically positioning a machine tool carriage at a precisely predetermined position, the combination in a machine tool having a frame and a carriage movably mounted on said frame, of drive mechanism for effecting movement of said carriage relative to said frame, a pump connected to be driven by said drive mechanism whenever said carriage is moving relative to said frame, power operated feeding mechanism including a normally engaged hydraulically actuated clutch connected to actuate said carriage drive mechanism for effecting feeding movements of said carriage, power operated positioning mechanism including a normally disengaged hydraulically actuated clutch selectively connectible to actuate said carriage drive mechanism for effecting positioning movement of said carriage at slow speed, a hydraulic conduit interconnecting said pump with both of said hydraulically actuated clutches, a normally open discharge valve connected to said conduit in manner to relieve pressure therein when said pump is operating, a preliminary trip mechanism operable upon said carriage arriving at a preliminary position to close said discharge valve thereby establishing pressure in said conduit to effect disengagement of said feeding clutch and engagement of said positioning clutch, a latch operative to latch said positioning clutch in engaged position to effect slow speed positioning movement of said carriage, and final trip mechanism operable upon said carriage arriving at a precisely predetermined final position to release said latch thereby disengaging said positioning clutch to stop said carriage at a precisely predetermined final position.

8. In apparatus for automatically positioning a machine tool carriage at a precisely predetermined position, the combination in a machine tool having a frame and a carriage movably mounted on said frame, of drive mechanism for effecting movement of said carriage relative to said frame, a pump connected to be driven by said drive mechanism whenever said carriage is moving relative to said frame, power operated traversing mechanism including a normally engaged hydraulically actuated clutch connected to actuate said carriage drive mechanism for effecting traversing movements of said carriage, power operated positioning mechanism including a normally disengaged hydraulically actuated clutch selectively connectible to actuate said carriage drive mechanism for effecting positioning movement of said carriage at slow speed, resilient means continuously urging said positioning clutch to disengaged position, a hydraulic conduit interconnecting said pump with both of said hydraulically actuated clutches, a normally open discharge valve connected to said conduit in manner to relieve pressure therein when said pump is operating, preliminary trip mechanism operable upon said carriage arriving at a preliminary position to close said discharge valve thereby establishing pressure in said conduit to effect disengagement of said traversing clutch and engagement of said positioning clutch to effect slow speed positioning movement of said carriage, a latch operative to latch said positioning clutch in engaged position in opposition to said resilient disengaging means, and final trip mechanism operable upon said carriage arriving at a precisely predetermined final position to release said latch thereby permitting said resilient means to disengage said positioning clutch to stop said carriage at a precisely predetermined final position.

9. A precision positioning mechanism disposed to selectively position a movable member of a machine tool and comprising a control unit fixedly mounted on the machine tool, a power driven screw threadably disposed to drive the movable member and journalled in said control unit, an auxiliary drive train connected to said control unit, a clutch element operatively disposed to engage and disengage said auxiliary drive from said screw, a precision screw mounted in said control unit for axial and rotative movement, a precision nut threadedly carried on said precision screw, a plurality of trip dogs disposed on the movable member and selectively positionable to engage said precision nut at predetermined points of movable member travel, and electric and hydraulic control means operatively controlled from said precision screw and nut and connected to control the operation of said clutch whereby said movable member is power driven from said screw and thereafter power driven from said auxiliary drive to selectively position said movable member.

10. In a machine tool, a frame, a carriage movably mounted on said frame, mechanism selectively connectible to actuate said carriage at a traversing rate, other mechanism selectively connectible to actuate said carriage at slow positioning rate, a pump driven in synchronism with movement of said carriage, trip mechanism disposed to be actuated by said carriage in the course of its movement and operative to block the escape of fluid from said pump, hydraulically actuated control mechanism operative by fluid pressure from said blocked pump to disengage said traversing rate carriage driving mechanism and to engage said slow rate positioning mechanism, and trip mechanism disposed to be actuated by said carriage upon its arrival at a precisely predetermined position and operative to disengage said slow rate positioning mechanism to position said carriage precisely.

11. In a machine tool, a base, a movable carriage slidably mounted on said base, a positioning mechanism mounted on said base, a control means disposed in said positioning mechanism to control a positioning function, a plurality of trip dogs adjustably mounted on said movable member, a precision screw and nut mounted for rotative and axial movement in said positioning mechanism and disposed to be actuated selectively by each of said trip dogs to operate said control mechanism, a hydraulic clamping means mounted on said base and operative on said movable member, and clamping control means connected to control the operation of said clamping mechanism and interconnected with said positioning mechanism control means whereby said movable member is clamped when said positioning mechanism has completed a positioning function and said clamping control means operates to unclamp said member before a succeeding position function is begun.

12. In a positioning mechanism for a movable carriage of a machine tool, a positive displacement pump driven in synchronism with movement of said carriage, trip mechanism operatively arranged to block the discharge of fluid from said pump upon said carriage arriving at a preliminary position to check the rate of movement of said carriage, a slow speed positioning drive mechanism selectively engageable to actuate said carriage at slow positioning rate, control apparatus operative in response to fluid pressure resulting from blocking said pump and functioning to engage said slow speed drive mechanism for effecting positioning of said carriage, and other trip mechanism operative upon said carriage arriving at a final position and functioning to disengage said slow speed drive mechanism to position said carriage at a precisely predetermined position.

13. A machine tool having a base with a movable member slidably mounted thereon and comprising a power source, a transmission driven from said power source, a reverser mechanism driven from said transmission and connected to drive said movable member, a positioning mechanism mounted on said base and driven from said reverser mechanism, an auxiliary drive train driven from said transmission and connected to said positioning mechanism, a hydraulic clamping means operatively disposed to clamp said movable member to said base, and automatic control means operative after said positioning mechanism has effectively positioned said movable member to clamp said movable member to said base.

14. In a positioning mechanism for a movable machine tool member, a power driven screw selectively operable to effect movement of said member, a positioning mechanism including control means operative to control the power drive to said screw and effectively position said movable member sequentially according to a preselected positioning cycle, a precision screw and nut assembly parallelly disposed to said power driven screw and operably connected to said positioning control means, and position indicative trip dogs disposed on said movable member to selectively actuate said precision screw and nut assembly and said position control mechanism whereby said precision screw and nut assembly serves as a variable measurement standard from which all linear measurements are obtained to control a positioning cycle.

15. A machine tool having a base with a carriage slidably mounted thereon and power driven by a screw and nut drive mechanism and comprising an auxiliary power drive mechanism selectively operable to effect movement of said carriage at a slow positioning rate, a positioning mechanism including a clutch assembly selectively engageable to connect said auxiliary drive mechanism with said screw and nut drive mechanism, a control mechanism associated with said positioning mechanism disposed to operate said clutch, a precision nut and screw assembly independently mounted on said machine tool and connected to operate said control means in said positioning mechanism, and position actuating means adjustably carried on said movable carriage and disposed to engage said precision screw and nut assembly whereby said precision mechanism operates to precisely position said movable carriage with said precision nut and screw serving to establish a standard of linear measurement independently of the carriage table screw and nut mechanism.

16. In a positioning mechanism for a movable machine tool member, driving mechanism operable to effect movement of said member at traversing rate, auxiliary driving mechanism operable to effect movement of said member at a positioning rate, a power source connected to drive each of said driving mechanisms, a positioning control mechanism operable to control the operation of said driving mechanisms, a precision screw and nut assembly constituting part of said control mechanism, a plurality of trip dogs adjustably mounted on said movable member and disposed to engage said precision nut to control the operation of either said traversing rate driving mechanism or said positioning rate driving mechanism selectively, and a positioning indicatng mechanism operative from said precision screw and nut assembly and said control mechanism whereby said movable member may be repeatedly positioned as determined from the location of said trip dogs on said movable member with each precise position indicated by said position indicating mechanism.

17. A positioning mechanism for a machine tool having a carriage slidably mounted for selective positioning and comprising a positioning casing mounted on said machine tool, a power driven screw rotatably mounted in said casing and operatively connected to said movable carriage, an auxiliary power drive disposed in said casing and including a clutch selectively operable to connect said auxiliary drive to said member driving screw, a precision screw and nut means mounted on said machine tool and journaled for rotative and axial movement in said casing, a plurality of trip dogs adjustably mounted on said movable carriage and disposed to selectively engage said precision nut, a circle plate disposed for unitary or independent rotation on said precision screw within said casing, a vernier scale fixedly mounted on said casing, linear distance indicating indicia on said circle plate disposed for reading against said vernier scale, a counter mechanism operatively driven from said circle plate, a precision screw movement indicating means mounted in said casing and disposed to indicate axial movement of said precision screw, and control mechanism contained in said casing and operatively connected with said precision screw and nut means to automatically engage and disengage said clutch connecting with said auxiliary drive mechanism whereby movement of said precision screw and nut means serves to actuate said control mechanism at predetermined points of carriage travel to effect precise positioning thereof with said indicating means serving to indicate axial movement of said precision screw and nut and the reading of said indicia on said dial plate and the reading on said counter serving to indicate the linear displacement of said movable carriage at a prescribed position.

18. A positioning mechanism for automatically positioning a movable member of a machine tool and comprising a power driven screw and nut mechanism operably connected to effect selective movement of said movable member at traversing rate, an auxiliary drive mechanism operably disposed to effect selective movement of said movable member at a slow positioning rate, a control mechanism automatically operable at predetermined points of movable member travel to utilize either drive to effect movement of said member, a precision screw and nut mechanism connected to said control mechanism and including trip dogs adjustably mounted on said movable member to engage said precision nut, a dial indicator operably disposed in said positioning mechanism to measure axial displacement of said precision screw and nut, a reference indicating abutment from which all axial movement of said precision screw is determined, an adjustably operable shifter mechanism disposed to selectively effect axial movement of said precision screw in determining the accumulative error in said control mechanism, and a braking mechanism operative to retain said precision screw and nut means against axial movement whereby said dial indicator serves to precisely indicate the position of said movable member with said accumulative error in said control mechanism automatically compensated for.

References Cited in the file of this patent

UNITED STATES PATENTS

| Number | Name | Date |
|---|---|---|
| 1,757,929 | Shaw et al. | May 6, 1930 |
| 2,123,825 | DeVlieg | July 12, 1938 |
| 2,131,973 | Rusnak et al. | Oct. 4, 1938 |
| 2,236,881 | Rusnak | Apr. 1, 1941 |
| 2,355,677 | Ransome | Aug. 15, 1944 |
| 2,370,222 | Bennett et al. | Feb. 27, 1945 |
| 2,393,928 | Nenninger et al. | Jan. 29, 1946 |
| 2,438,235 | Strom | Mar. 23, 1948 |
| 2,481,383 | Bickel et al. | Sept. 6, 1949 |
| 2,486,075 | Strom | Oct. 25, 1949 |
| 2,491,381 | Lange | Dec. 13, 1949 |
| 2,559,839 | Andrew et al. | July 10, 1951 |
| 2,560,149 | Armitage | July 10, 1951 |